US010156669B2

(12) United States Patent
Beresna et al.

(10) Patent No.: US 10,156,669 B2
(45) Date of Patent: Dec. 18, 2018

(54) SPACE VARIANT POLARIZATION CONVERTER

(75) Inventors: Martynas Beresna, South Hampton (GB); Peter Kazansky, South Hampton (GB)

(73) Assignee: University of Southampton, Southampton (GB)

( * ) Notice: Subject to any disclaimer, the term of this patent is extended or adjusted under 35 U.S.C. 154(b) by 156 days.

(21) Appl. No.: 14/115,300

(22) PCT Filed: May 3, 2012

(86) PCT No.: PCT/IB2012/052217
§ 371 (c)(1),
(2), (4) Date: Feb. 14, 2014

(87) PCT Pub. No.: WO2012/150566
PCT Pub. Date: Nov. 8, 2012

(65) Prior Publication Data
US 2014/0153097 A1    Jun. 5, 2014

(30) Foreign Application Priority Data

May 3, 2011    (GB) .................................. 1107253.5

(51) Int. Cl.
*G02B 5/30*    (2006.01)
*G02B 5/18*    (2006.01)
*G02B 27/28*    (2006.01)

(52) U.S. Cl.
CPC .......... *G02B 5/3083* (2013.01); *G02B 5/1809* (2013.01); *G02B 27/286* (2013.01)

(58) Field of Classification Search
CPC ...... G02B 5/1809; G02B 5/1833; G02B 5/18; G02B 5/513083; G02B 5/3083
(Continued)

(56) References Cited

U.S. PATENT DOCUMENTS

| 4,589,686 A | 5/1986 | Mcgrew |
| 4,758,296 A | 7/1988 | Mcgrew |

(Continued)

FOREIGN PATENT DOCUMENTS

| EP | 0764858 A2 | 3/1997 |
| EP | 2163923 A1 | 3/2010 |

(Continued)

OTHER PUBLICATIONS

"Great Britain Application Serial No. GB1107253.5, Search Report dated Sep. 1, 2011", 3 pgs.

(Continued)

*Primary Examiner* — Darryl J Collins
*Assistant Examiner* — Journey Sumlar
(74) *Attorney, Agent, or Firm* — Schwegman Lundberg & Woessner, P.A.

(57) ABSTRACT

This patent describes an optical element, which converts incident linearly or circularly polarized visible light into radially or azimuthally polarized light beam. The polarization converter is a single optical element, produced by direct laser writing technique in an optically transparent substrate. Direct laser writing based on ultra-short pulsed laser radiation forms form birefringence self-assembled nanogratings in optically transparent material, such as fused silica. The period of gratings is smaller than wavelengths of a visible light.

14 Claims, 5 Drawing Sheets

(58) Field of Classification Search
USPC ......... 359/566, 573, 489.01, 489.03, 489.06, 359/489.07, 489.11
See application file for complete search history.

(56) References Cited

U.S. PATENT DOCUMENTS

| | | | |
|---|---|---|---|
| 4,906,315 A | 3/1990 | Mcgrew | |
| 5,085,514 A | 2/1992 | Mallik et al. | |
| 5,694,247 A | 12/1997 | Ophey et al. | |
| 5,787,102 A | 7/1998 | Alexander et al. | |
| 6,822,769 B1 | 11/2004 | Drinkwater et al. | |
| 2004/0223156 A1* | 11/2004 | McGrew | G02B 5/1809 356/364 |
| 2006/0028706 A1 | 2/2006 | Totzeck et al. | |
| 2007/0115551 A1* | 5/2007 | Spilman et al. | 359/494 |
| 2007/0122573 A1 | 5/2007 | Yasuike et al. | |
| 2009/0214885 A1 | 8/2009 | Her et al. | |

FOREIGN PATENT DOCUMENTS

| | | |
|---|---|---|
| WO | WO-2007122573 A2 | 11/2007 |
| WO | WO-2008068753 A2 | 6/2008 |
| WO | WO-2012150566 A1 | 11/2012 |

OTHER PUBLICATIONS

"International Application Serial No. PCT/IB2012/052217, International Search Report dated Sep. 21, 2012", 4 pgs.

"International Application Serial No. PCT/IB2012/052217, International Written Opinion dated Nov. 3, 2013", 6 pgs.

Guo, Zhongyi, et al., "Generating Optical Vortex with Computer-Generated Hologram Fabricated Inside Glass by Femtosecond Laser Pulses", Optics Communications 273, (2007), 286-289.

Guo, Zhongyi, et al., "Several Diffractive Optical Elements Fabricated by Femtosecond Laser Pulses Writing Directly", Coherence and Ultrashort Pulse Laser Emission, (2010), 609-628.

Ran, Lingling, et al., "Self-assembled volume vortex grating induced by femtosecond laser pulses in glass", Current Applied Physics, (2009), 1210-1212.

Halir, Robert, et al., "Waveguide sub-wavelength structures: a review of principles", Laser & Photonics Reviews 9.1, (2015), 25-49.

"EP Application Serial No. 12729709.1, Office action dated Aug. 14, 2017", 5 pgs.

Shimotsuma, Yasuhiko, et al., "Ultrafast Manipulation of Self-Assembled Form Birefringence in Glass", Material Views, Advanced Materials, wileyonlinelibrary.com, (2010), 4039-4043.

\* cited by examiner

SPACE VARIANT POLARIZATION CONVERTER

CLAIM OF PRIORITY

This application is a U.S. National Stage Application filed under 35 U.S.C §371 of International Application Serial No. PCT/IB2012/052217, filed May 3, 2012, and published as WO 2012/150566 A1 on Nov. 8, 2012, which claims the benefit of priority to United Kingdom Application GB 1107253.5, filed May 3, 2011, wherein both applications are incorporated herein by reference in their entireties.

FIELD OF THE INVENTION

The present invention relates to optical elements. More particularly it relates geometrical phase optical elements with space-variant structures formed for polarization conversion of transmitted visible light.

BACKGROUND OF THE INVENTION

Beams with radial or azimuthal polarization attract significant interest due to unique optical properties associated with their inherent symmetry. Such beams enable resolution below the diffraction limit and interact without the undesirable anisotropy produced by linearly polarized light. The large longitudinal electric field component of these beams is attractive for applications, such as particle acceleration.

Several methods have been proposed for the generation of space variant polarized beams, including birefringence manipulation with liquid crystals and polarization selection inside a laser resonator. However, the low damage threshold restricts the application of liquid crystal based beam converters. Alternatively, it has been demonstrated that the polarization can be manipulated by the form birefringence associated with the sub-wavelength gratings. It has been also observed that the space variant phase produced by these converters can create a polarization vortex, i.e. the beam with the orbital angular momentum, where its sign depends on the handedness of incident circular polarization. Photolithography, which is usually used for fabrication of such structures, has a limiting resolution that restricts the wavelength of operation to the far infrared.

A European patent EP0764858 describes an arrangement, which converts an input light beam into an output beam of light which is linearly polarised in the radial direction essentially over its entire cross-section. The polarisation direction of the input light beam is rotated and is not selected. The arrangement contains a raster, segment or facetted device with more than 4 half-wave plates (4*i*) whose preferred direction (2*i*) is aligned so that each half-wave plate deflects the polarisation direction of the linearly polarised light passing through it along a radius (3*i*) intersecting the half-wave plate on the optical axis.

Patent US2007115551 describes embodiments of an invention, directed to apparatus and methods for converting spatially homogeneously polarized light into spatially inhomogeneously polarized light having a fast axis orientation that varies in a smooth and continuous manner over a pupil aperture. A space-variant waveplate referred to herein as a polarization converter includes an optically transmissive window characterized by a symmetric stress birefringence that provides at least lambda/4 retardance and, more particularly, lambda/2 retardance over an annular region centered about the optical axis of the window. Structural embodiments of the polarization converter include mechanical compression housing and a thermal compression housing. Radially and azimuthally polarized vortex beams including cylindrical vector beams and counter-rotating beams can be generated from uniformly plane polarized input beams propagating through the polarization converter. Low-order polarization vortex beams can be optically combined to produce higher-order scalar vortex beams. Embodiments of the invention are also directed to various optical illumination and imaging systems utilizing the apparatus and methods described herein.

There is a need for polarization converters, which can convert linearly or circularly polarized light beam into radially or azimuthally polarized light beam in the visible light region. The optical element has to be efficient enough in order to use it in industrial and scientific applications. The transmission should be at least 60% or more, which is impossible when using several polarization conversion elements in a row.

BRIEF DESCRIPTION OF THE INVENTION

This patent describes an optical element, which converts incident linearly or circularly polarized visible light into radially or azimuthally polarized light beam. The polarization converter is a single optical element, produced by direct laser writing technique in an optically transparent substrate. Direct laser writing based on ultra-short pulsed laser radiation forms form birefringence self-assembled nanogratings in optically transparent material, such as fused silica. The period of gratings is smaller than wavelengths of a visible light.

Furthermore, in accordance with some preferred embodiments of the present invention, for formation of the nanograting, ultra-short pulse laser is used, in particular—femtosecond laser.

DESCRIPTION OF DRAWINGS

In order to better understand the invention, and appreciate its practical applications, the following pictures are provided and referenced hereafter. Figures are given as examples only and in no way limit the scope of the invention FIG. 1. (*a*) Schematic drawing of nanograting distribution in polarization converter. (*b*, *c*) Distribution of the electric field for left-hand and right-hand circularly (see white circles) polarized beam after passing through the polarization converter. (*d*, *e*) Measured beam profiles of argon ion cw laser before and after beam converter. (*f*) Modelled beam profile after beam converter.

DETAILED DESCRIPTION OF PREFERRED EMBODIMENTS

A preferred embodiment of the invention is an optical element, having induced form birefringence subwavelength gratings in the region of clear aperture. For production of such element, ultra-short pulse, such as picosecond or femtosecond, laser direct writing technique is used due to the possibility of energy deposition within the focal volume with a resolution of more than hundred nanometers. Depending on the amount of deposited energy three distinctive types of modifications can be induced in the bulk of transparent materials. In particular, moderate fluencies result in the spontaneous formation of nanogratings, which produce a form birefringence, referred as type 2 modification, with the slow and fast optical axes aligned respectively parallel and perpendicular to the grating corrugation.

The most preferred embodiment of the invention is an optical polarization vortex converter, produced by means of femtosecond laser direct writing in fused silica by employing phenomenon of self-assembly of nanostructures. Using femtosecond laser imprinting of space-variant self-assembled form birefringence in silica glass, the process offers a flexible and simple way for fabrication of polarization sensitive devices for the visible spectral range.

Polarization converters can be designed for incident beams with linear or circular polarization. For the incident linearly polarized beam, a half-wave plate with continuously varying slow axis direction has to be constructed, which rotates the incident linear polarization by the angle necessary to produce a radial distribution of the electric field. For the incident circular polarized beam, the radial or azimuthal polarization can be formed with a space variant quarter-wave plate possessing a radial symmetry (FIG. 1a), which can be described using Jones calculus with the following matrix:

$$\begin{pmatrix} \cos^2\theta + i\sin^2\theta & (1-i)\cos\theta\sin\theta \\ (1-i)\cos\theta\sin\theta & i\cos^2\theta + \sin^2\theta \end{pmatrix}$$

where angle $\Theta = \varphi + \pi/4$ and $\varphi$ is a polar angle. Multiplying a vector describing the left handed circular polarization by this matrix the following expression is derived:

$$\begin{pmatrix} \cos^2\theta + i\sin^2\theta & (1-i)\cos\theta\sin\theta \\ (1-i)\cos\theta\sin\theta & i\cos^2\theta + \sin^2\theta \end{pmatrix} \frac{1}{\sqrt{2}} \begin{pmatrix} 1 \\ i \end{pmatrix} = \begin{pmatrix} -\sin\phi \\ \cos\phi \end{pmatrix} e^{i\phi} e^{i\frac{\pi}{4}}.$$

Figure 1:
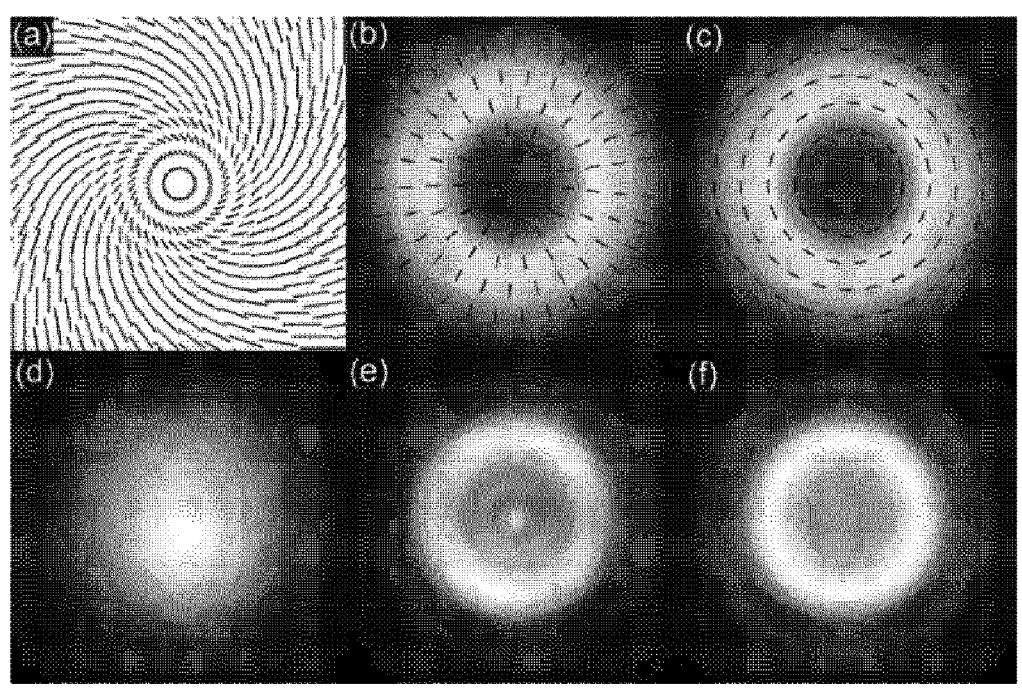

Neglecting constant phase shift $\pi/4$ we see that the resultant electric field possess the azimuthal orientation and the orbital angular momentum l=1, as is indicated by the exponent with the complex argument. If the vector of the right handed circular polarization is treated by this Jones matrix, then one would obtain the radial polarization with the orbital angular momentum l=−1. Thus the space variant phase of the converter produces a polarization vortex beam with the orbital angular momentum, where its sign is controlled with the handedness of the incident circular polarization. Furthermore, depending on the handedness of the incident circular polarization, the radial or azimuthal polarization can be obtained with the same birefringent element (FIG. 1 b,c).

The advantage of the quarter-wave plate based converter over the half-wave plate one is a considerably smaller retardance value, R=Δnd for a given induced birefringence Δn and length of structure d, which is needed for the polarization conversion, e.g. R≈130 nm for 532 nm wavelength.

Figure 2:
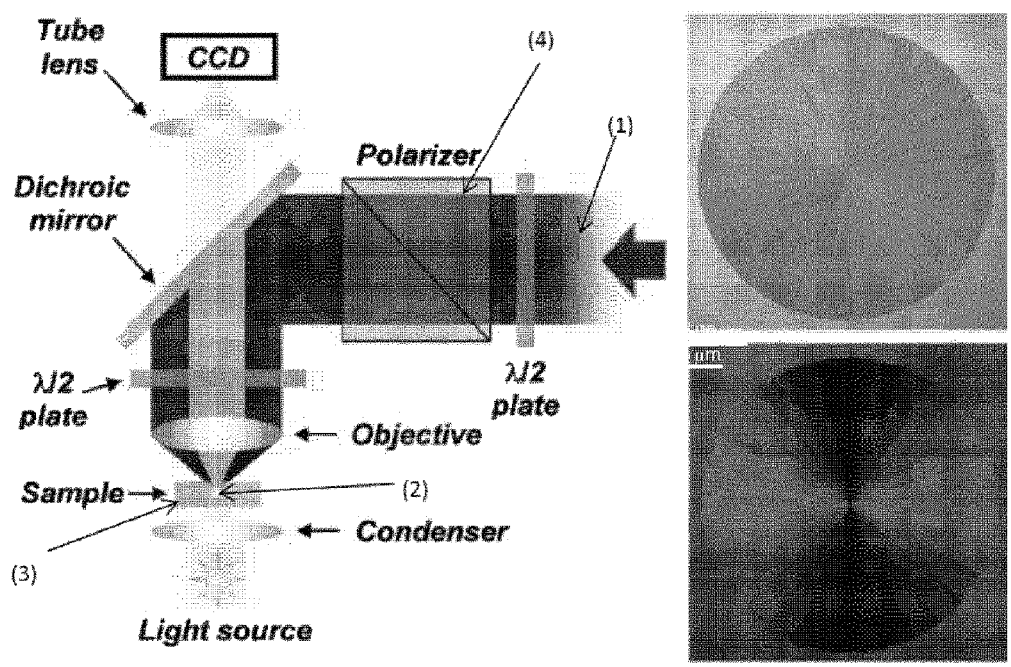
FIG. 2. (Left) The setup for femtosecond laser direct writing. (Right) Microscope images of the polarization converter in the bright field and crossed polarizers. The diameter of the circle is 1.2 mm. The radial lines emerging from the centre of the structure are due to finite step size in the writing process, which results in the visible segmentation of the structure.
Figure 3:
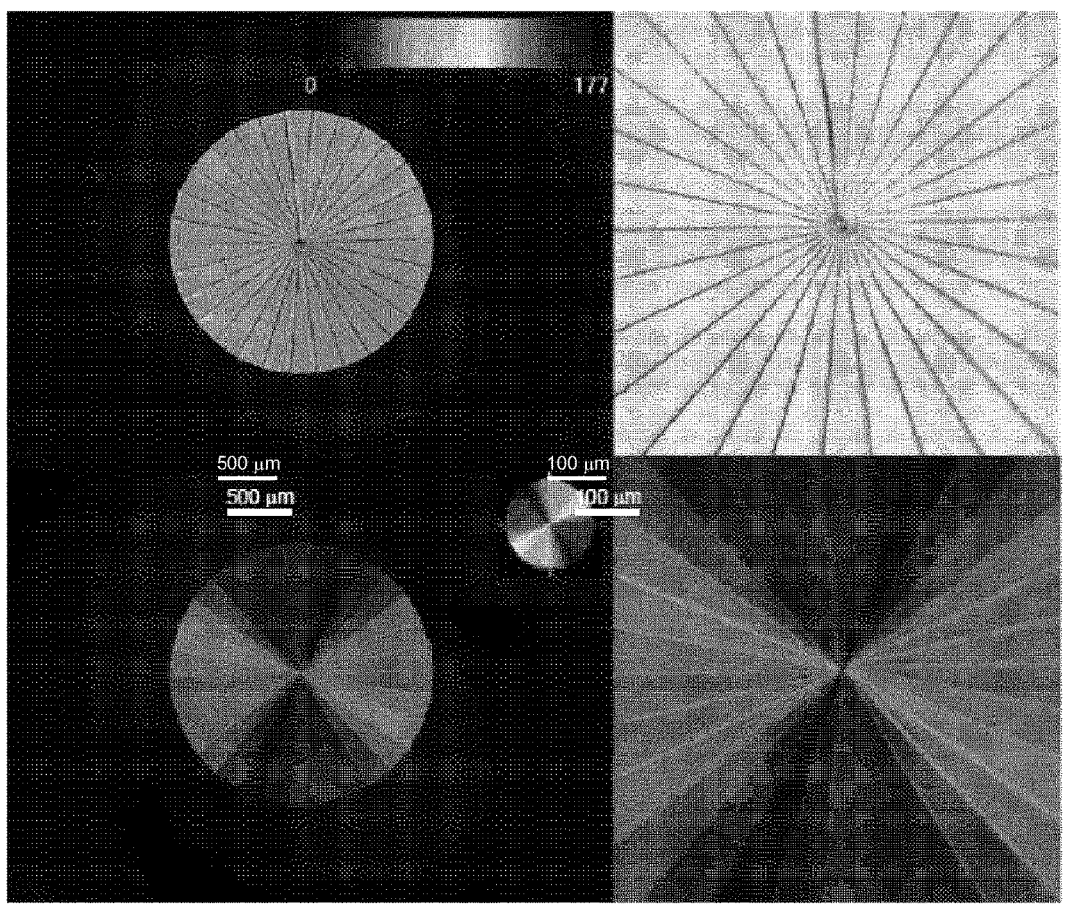
FIG. 3. Birefringence characterization of the structure. The top images represent retardance value distribution with 5× (left) and 20× (right) magnification of the structure. The bottom images represent the distribution of slow axis.

A relatively low numerical aperture (NA) objective (i.e. 20×, NA=0.35) can be chosen for the fabrication, since the retardance value increases with the structure length, which is longer for lower NA objectives yielding a longer Rayleigh length. Retardance as high as R=260 nm is sufficient for the fabrication of polarization converters working in the visible and near infrared wavelength range. The optimum values for the pulse energy, repetition rate and writing speed required to achieve the desired quarter-wave retardance at 532 nm wavelength, were found to be 0.5 µJ, 200 kHz and 1 mm/s respectively. The laser beam (1) is typically focused below the surface of a fused silica sample (2), which is mounted onto XYZ linear translation stage system (3). The stages are controlled to move in a spiral trajectory with steps of 1 µm, enabling in a complete scan to cover uniformly a circular area of sufficient diameter, typically the diameter of a clear aperture. The laser beam polarization azimuth is manipulated by an achromatic half-wave plate mounted on a motorized rotation stage (4). By controlling the angle of the half-wave plate and XY stage position, a space-variant quarter wave plate with the desired geometry of anisotropic modification distribution is fabricated (FIG. 2).

Figure 4:
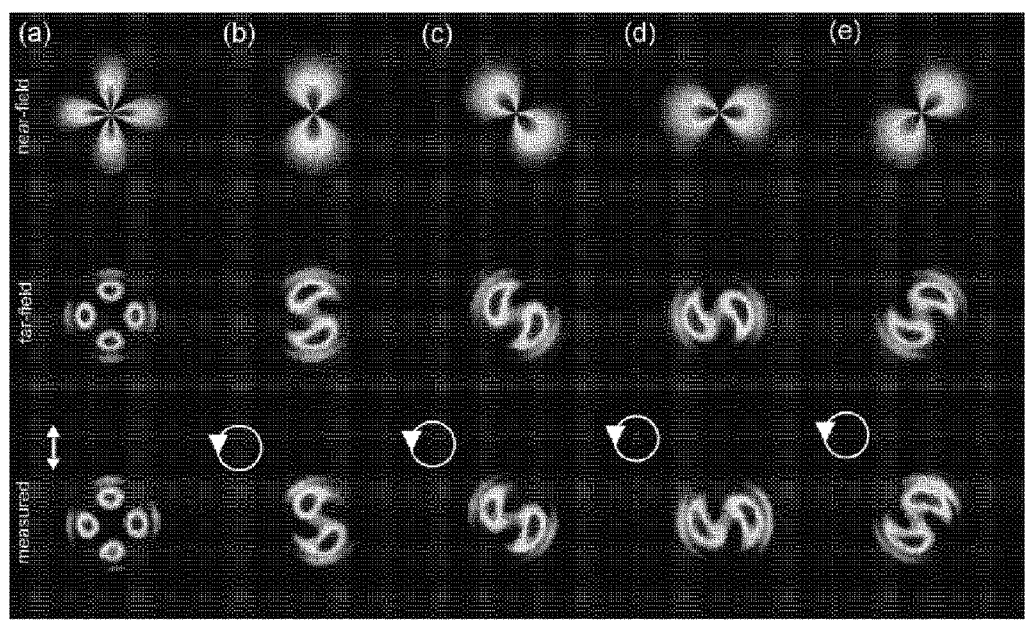
FIG. 4. Modeled near and far-field (top and middle) and measured (bottom) intensity distributions after the polarization converter for incident linear polarization (*a*) and for left handed circular polarization (i.e. azimuthal polarization with the orbital angular momentum l=1 is generated) at different angles of polarizer 0° (*b*), 45° (*c*), 90° (*d*), 135° (*e*). White arrows indicate incident polarization state.
Figure 5:
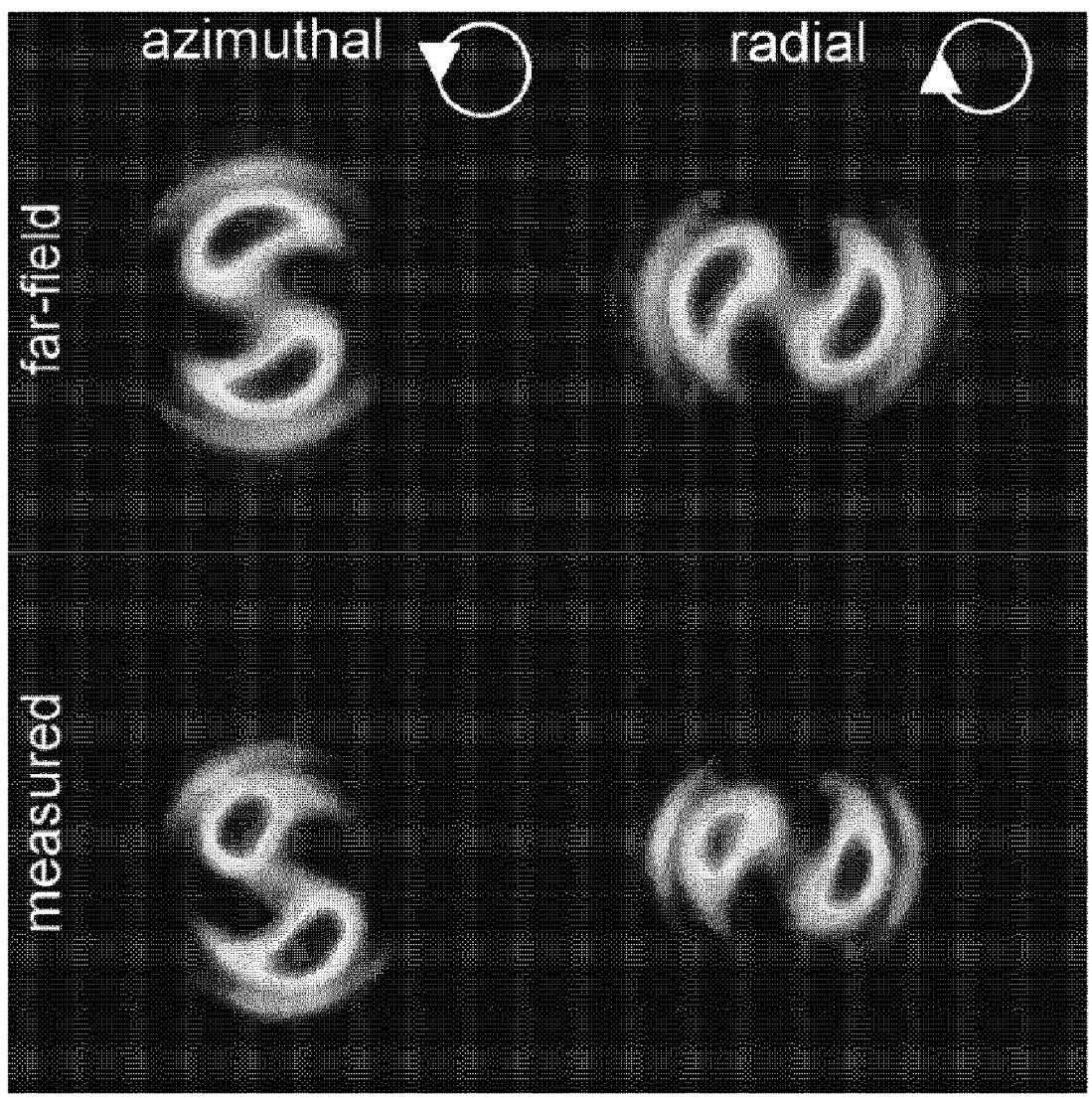
FIG. 5. Modelled and measured far-field patterns of optical vortices with azimuthal and radial polarization at 532 nm and the same (horizontal) orientation of linear analyser. White arrows indicate incident polarization state.

In the far-field the diffraction distorts this shape producing a typical 's' shape pattern, although it can be restored in the near-field by focusing the beam again. The appearance of a 's' shape pattern, which is typical for double charged optical vortices, can be explained as follows. An azimuthally (radially) polarized vortex with the orbital angular momentum l=1 (l=−1) can be considered as a superposition of two circularly polarized beams, one possessing the orbital angular momentum l=2 (l=−2), and the other with a plane front. The interference of these two beams after the polarizer (analyzer) produces a characteristic 's' shape pattern, which was observed (FIG. 4). The observed pattern indicates also the presence of a phase discontinuity as it was confirmed by the modeling. Moreover, the theoretical prediction of the dependence of orbital momentum sign on the sense of incident circular polarization was also experimentally confirmed by comparing the far-field images of radially and azimuthally polarized beams produced by incident left and right circular polarizations (FIG. 5). The sense and the orientation of the 's' shape were changing with the handedness of circular polarization. The transmission of the element at 532 nm wavelength was estimated about 70%. The losses are attributed to the microscopic inhomogeneities and induced defect absorption, which could be reduced by optimizing the writing parameters.

In summary, by exploiting the ability of femtosecond lasers to create subwavelength anisotropic modifications inside silica glass, a polarization vortex converter, operating in the visible is demonstrated. A significant advantage of the technique is the possibility of achieving radial or azimuthal polarizations with a single optical element, simply by controlling the handedness of the incident circular polarization.

The invention claimed is:

1. A polarization converter for converting a polarization state of a light beam having a wavelength, the polarization converter comprising:
an optically transparent substrate;
a plurality of laser induced form birefringent structures formed from and within the bulk of the optically transparent substrate,
wherein the plurality of laser induced form birefringent structures are configured to produce an optical retardance that varies in orientation across the light beam,
wherein the plurality of laser induced form birefringent structures include subwavelength gratings which are self-assembled nanogratings, and
wherein the nanogratings have a period smaller than the wavelength.

2. The polarization converter according to claim 1, wherein said subwavelength gratings are formed by ultra-short pulse direct laser writing.

3. The polarization converter according to claim 1, wherein a clear aperture region of the optical device exhibits a smoothly varying principal form direction such that the form birefringence exhibited by the birefringent structures varies smoothly.

4. An optical system for improved resolution imaging of an object, comprising:
at least an illumination source that provides spatially homogeneously polarized light along an illumination path, including an polarization filter according to claim 1 in the illumination path on an object side of the system.

5. An optical system for laser material processing, comprising:
at least a laser source with homogeneously polarized beam, including an polarization filter according to claim 1 in the laser beam path of the system.

6. The polarization converter of claim 1, wherein the birefringent structures produce an optical vortex.

7. The polarization converter of claim 1, wherein the period of the nanogratings is smaller than a wavelength of visible light.

8. The polarization converter of claim 1, wherein the optically transparent substrate comprises fused silica.

9. An optical device comprising:
the optical device for converting an entry light beam into an exit light beam with a defined spatial distribution of polarization states, wherein the optical device is arranged as a half-wave plate with continuously varying slow axis direction to convert incoming linearly polarized beam to a radially or azimuthally polarized beams,
wherein the optical device includes laser induced form birefringent structures formed in the bulk of a transparent optical substrate over at least a portion of the clear aperture sufficient to produce an optical retardance, wherein said birefringent structures are subwavelength gratings which are self-assembled nanogratings, and wherein the period of the nanogratings is smaller than the wavelength of the entry light beam.

10. An optical device comprising:
the optical device for converting an entry light beam into an exit light beam with a defined spatial distribution of polarization states,
wherein the optical device includes laser induced form birefringent structures formed in the bulk of a transparent optical substrate over at least a portion of the clear aperture sufficient to produce an optical retardance, wherein said birefringent structures are subwavelength gratings which are self-assembled nanogratings, and wherein the period of the nanogratings is smaller than the wavelength of the entry light beam,
wherein the birefringent structures are arranged as a quarter-wave plate possessing a radial symmetry to convert incoming circularly polarized beam to a radially or azimuthally polarized vortices.

11. The optical device according to claim 9 wherein the radial or azimuthal polarizations are obtained with the same birefringent structures by changing handedness of the incident circular polarization.

12. A method comprising:
producing a polarization converter for converting a circularly or linearly polarized entry light beam into an exit light beam having radial or azimuthal polarization,
wherein form birefringent optical structures are induced by ultra-short pulse laser radiation of a transparent optical substrate, and wherein said birefringent structures are subwavelength gratings which are self-assembled nanogratings formed from and within the bulk of the transparent optical substrate.

13. The method of claim 12, when the ultra-short pulse laser radiation includes a picosecond or femtosecond laser radiation.

14. The method of claim 12, further comprising:
providing an optically transparent substrate; and
directing laser writing onto said substrate wherein said laser is picosecond or femtosecond laser, the amount of energy deposited by the laser being controlled to produce spontaneous formation of nanogratings within and from the bulk of said substrate, said nanogratings being said subwavelength gratings exhibiting form birefringence.

* * * * *